United States Patent
Iwamura (10) Patent No.: US 7,450,638 B2
(45) Date of Patent: Nov. 11, 2008

(54) POWER-LINE COMMUNICATION BASED SURVEILLANCE SYSTEM

(75) Inventor: Ryuichi Iwamura, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 775 days.

(21) Appl. No.: 10/624,706

(22) Filed: Jul. 21, 2003

(65) Prior Publication Data
US 2005/0018766 A1    Jan. 27, 2005

(51) Int. Cl.
H04N 7/12     (2006.01)
(52) U.S. Cl. ............. 375/240.01; 375/240; 375/240.02; 375/240.12
(58) Field of Classification Search ............ 375/240.01, 375/240, 240.28, 240.02, 240.12; 348/143, 348/159
See application file for complete search history.

(56) References Cited

U.S. PATENT DOCUMENTS

| | | | |
|---|---|---|---|
| 4,831,438 A | 5/1989 | Bellman, Jr. et al. | |
| 5,128,755 A | 7/1992 | Fancher | |
| 5,243,425 A | 9/1993 | Thompson | |
| 5,517,236 A | 5/1996 | Sergeant et al. | |
| 5,625,863 A | 4/1997 | Abraham | |
| 5,844,520 A | 12/1998 | Guppy et al. | |
| 6,392,692 B1 | 5/2002 | Monroe | |
| 6,418,169 B1 * | 7/2002 | Datari | 375/240.28 |
| 6,424,371 B1 | 7/2002 | Wen | |
| 6,476,858 B1 * | 11/2002 | Ramirez Diaz et al. | 348/159 |
| 6,542,621 B1 | 4/2003 | Brill et al. | |
| 6,757,008 B1 * | 6/2004 | Smith | 348/143 |

OTHER PUBLICATIONS

SeaView Technology:: Video Surveilllance Cameras v2, "SecureView Outdoor Camera and Decoder—Model: SVS-1", www.seaview.com, Jun. 13, 2003.
SeaView Technology:: Video Surveilllance Cameras v2, "SecureView Outdoor Camera and Decoder—Model: SVS-2", www.seaview.com, Jun. 13, 2003.
SeaView Technology:: Video Surveilllance Cameras v2, "SecureView Single Receiver/Decoder—Model: SVR-1", www.seaview.com, Jun. 13, 2003.
SeaView Technology:: Video Surveillance Cameras v2, "SecureView Box Sets—Model: SBOX", www.seaview.com, Jun. 13, 2003.

* cited by examiner

Primary Examiner—Allen Wong
(74) Attorney, Agent, or Firm—John P. O'Banion (57) ABSTRACT

A surveillance system configured for communicating with video cameras and other devices connected over a power-line communication network, such as within a residence, or alternatively a commercial building. The system may be manufactured and installed at low cost without the need to route individual cables to each surveillance video camera or device. Bandwidth within the power-line communication network is preferably dynamically allocated to device streams by a server in response to predetermined and event-driven priorities. By way of example, remote communication is supported for allowing remote access to surveillance data and control of the surveillance system. The system may be implemented as a standalone unit or integrated within existing forms of electronics equipment, such as consumer electronics equipment including a television set, a set-top box, or other forms of video-enabled equipment that is adapted for performing power-line network communication.

41 Claims, 3 Drawing Sheets

POWER-LINE COMMUNICATION BASED SURVEILLANCE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to surveillance systems, and more particularly to surveillance systems that communicate with surveillance devices over a power-line network within the associated structure.

2. Description of Related Art

The use of area surveillance by surveillance systems has been on the increase. In particular, residential surveillance systems are in particularly high demand. Conventional systems, however, are difficult and expensive to install in existing structures, as installation requires both the installation of a control center and video imagers (i.e. video cameras), along with the routing of cables interconnecting the equipment.

Problems also arise with regard to connecting multiple video imaging devices within current systems, in particular when utilizing analog video feeds which generally require a separate cable connection for each video imager. Another set of issues surrounds the use of digital networks, (i.e. Ethernet), wherein bandwidth limitation and cost factors arise. Although the cost of video imagers (i.e. charge-coupled device (CCD) imagers) has dropped below one hundred dollars per unit; the cost of control centers, monitors, and time lapse recording devices are still generally beyond what many consumers, and some commercial institutions, can reasonably justify.

Therefore, a need exists for a surveillance system that is inexpensive and can be deployed easily in residential and cost-sensitive commercial installations. The present invention satisfies those needs, as well as others, and overcomes the deficiencies of previously developed surveillance systems.

BRIEF SUMMARY OF THE INVENTION

This invention is a surveillance system utilizing a server that receives video streams from video surveillance equipment and controls the display of surveillance information to a user or sent to a video recording device. Video streams are received by the server, over the AC power-line, from video surveillance equipment that communicates using power-line communication (PLC). The server is configured for controlling how the video streams are presented to a user or stored on a video recording device. The system can support passing multiple surveillance streams over the PLC network, wherein the server can allocate bandwidth for the streams based on predetermined and event driven settings.

The surveillance system according to the invention is particularly well suited for use in the residential surveillance market. A user can readily install a video camera anywhere a power outlet exists, because communications are routed over the power lines within the residence (or commercial building). The user need not route cabling to any of the video imagers or other devices to be connected within the system. The power connection and communication connection for each device (i.e. video camera, display, etc.) are provided for by simply plugging the video camera into an AC power outlet.

The term "video" is utilized herein in its broadest sense, and may comprise a video sequence with or without sound, low rate video sequences, sequenced image shots, along with other image forms received during surveillance.

When multiple streams are passed over the AC power-line, the present invention can perform dynamic bandwidth allocation, wherein the bandwidth allocated for each video imaging device, or other device, connected to the AC power-line network is modulated in response to predetermined and event-driven settings. Bandwidth allocation is performed by modulating bandwidth related configuration of the devices connected to the power-line network, such as video imaging devices. By way of example, bandwidth related configuration of the video imaging device may comprise setting video controls such as color depth (i.e. color/monochrome selection and number of bits per pixel), image size, image resolution, framing rate, and combinations thereof.

Allocation of bandwidth may follow predetermined bandwidth selections, such as in response to user prioritization of image feeds from video imaging devices. Allocation may be driven by events, separately or in combination with user selection. By way of example, one form of event that can drive bandwidth allocation within the present system is that of a motion detection event, preferably generated by a video imaging device, or in association with a location nearby the video imaging device. Dynamic bandwidth allocation, and other aspects of the invention, allow the system to support the use of multiple video cameras within the bandwidth constraints of the power line, without resorting to the routing of high speed optical fiber connections or other similar high-bandwidth connections.

The present system utilizes a residential network server, such as integrated within a consumer electronics device (i.e. television, set-top box, video recorder, or similar) as a control center unit and storage device (i.e. hard-disk drive or other mass storage device) for the surveillance system, eliminating the need to purchase expensive time lapse video recorders.

From a user perspective, it will be appreciated that with the present invention they need never again miss clear video images during any emergency situation. By sending commands to the server the user can control the video cameras communicating over the power-line network and the presentation of the surveillance information. For example the user can communicate commands to the server using a wireless remote control (i.e. infrared optical, or radio frequency), such as utilized for controlling their living room television set. Additionally, the system can provide remote monitoring over a remote communication medium, such as telephone or Internet connectivity. No additional devices are required to implement the surveillance system, such as time lapse equipment, video recorders, controllers, image control consoles, and so forth.

The server for the present system may be hosted by a conventional computer server, however, it should be appreciated that many other devices may contain suitable storage and processing hardware within which programming according to the present invention may be executed for performing the functions of the surveillance server described according to the present system. By way of example and not limitation, these systems include television sets, gaming consoles, set top boxes, video recording systems, and so forth.

The present invention may be generally described as a system for providing area surveillance, comprising: (a) at least one video imaging device configured for transmitting a video data stream over an AC power-line; (b) a video display interface device; and (c) means for receiving said video data stream from said AC power-line and controlling presentation of said received video data stream as passed to said video display interface device for storage or presentation to a user. A server provides the means for receiving the data stream and controlling presentation, and when multiple surveillance video data streams are available it dynamically allocates the AC power-line bandwidth for the video imaging devices, such as by controlling their video framing rates, resolution, color mode, and so forth.

Preferably the video display interface is integrated within a computer server, which preferably comprises a computer operating as a video server. The server can communicate video streams over the power line and is optionally configured for transmitting video data streams over a remote communication link to a location outside of the local PLC network which is typically beyond the communication range of said AC power line. It will be appreciated that PLC network communication has a range that is generally limited to a local area, such as within a residence. The remote communication link allows communicating with remote devices over a form of wide-area network (i.e. telephone, cable, wireless telephone network). The computer server operates according to selections made by the user in response to interaction by a user interface which captures user commands for controlling the collection and display of the video streams.

When communicating with remote devices outside of the power-line interface, the system preferably incorporates means of authenticating an authorized user, such as the decrypting of communications with the remote electronic device in response to the entry of a proper identifier.

Video imagers for use within the present system can be generally described as an apparatus for imaging an area under video surveillance, comprising: (a) an image sensor; (b) a communications interface configured for communicating over an AC power-line with a server, wherein dynamic bandwidth allocations are received from the server, and video signals from the image sensor subject to the dynamic bandwidth allocation are transmitted to the server. Preferably the video imager encodes the video signals into a format according to a Moving Picture Experts Group (MPEG) video format. In addition, the video imager preferably senses motion and communicates that motion over the AC power-line to the computer server.

Computer servers for serving the video within the present invention may be generally described as an apparatus for controlling video surveillance, comprising: (a) a power-line interface configured for communicating over an AC power-line with remote video imaging devices; (b) a user interface configured for capturing user preferences for controlling the collection and display of the video streams; and (c) a computer server configured for allocating bandwidth to remote video imaging devices and receiving video streams subject to the bandwidth allocation over the power-line interface, wherein the computer server is also configured to communicate these video streams for storage and/or display device according to user preferences.

The computer server preferably also comprises a data storage device within which selected portions of video streams may be stored, and a remote communications interface configured for communicating the video streams received within the computer server to a remote user at a location beyond the range or extent of the power-line interface.

The surveillance system according to the present invention may be implemented as programming for execution on a computer which has the necessary PLC network interface, processing power, communication, and storage hardware to execute the server functionality. The programming may be resident within programmed circuits, computer readable media (i.e. physical media or content distributed such as by downloading), or combinations thereof, without departing from the teachings herein.

By way of further illustration the invention may be generally described as a method of providing area surveillance, comprising: (a) generating video signals in response to video surveillance of one or more areas; (b) communicating the video signals over an AC power line subject to dynamic bandwidth allocation; (c) receiving the video signals within a computer server connected to the AC power line; and (d) communicating selected portions of the video signals from the computer server to a display in response to predetermined or event driven criterion. The method preferably also includes storing select elements of the video signals and altering bandwidth allocation for video signals in response to predetermined or event driven criterion, such as the detection of motion.

A number of aspects of the present invention are described herein, it should be appreciated that these aspects may be implemented separately or in various combinations thereof, without departing from the teachings of the present invention.

An aspect of the invention is that of providing a surveillance system that may be installed within a building structure without routing communication wiring between stations.

Another aspect of the invention is that of providing a surveillance system that may be manufactured at low cost.

Another aspect of the invention is that of providing a surveillance system whose functionality may be integrated into existing consumer electronic equipment at low incremental cost.

Another aspect of the invention is that of providing a surveillance system that can operate in conjunction with other networked devices, such as television sets, personal computers, audio systems, and the like.

Another aspect of the invention is that of providing a surveillance system that can automatically configure itself for the conditions.

Another aspect of the invention is that of providing a surveillance system that supports remote monitoring and recording capabilities.

Another aspect of the invention is the routing of video streaming from surveillance video cameras and other devices over the power lines in a residential or commercial structure, to a server that controls surveillance activity.

Another aspect of the invention is reducing bandwidth requirements per video camera utilizing dynamic bandwidth allocation mechanisms based on prioritization that may be based on motion sensing.

Another aspect of the invention is providing a surveillance network configuration that allows various surveillance equipment, as well as sensors, annunciators and displays to be connected.

Another aspect of the invention is provide a surveillance system in which the resolution, color range (i.e. monochrome or amounts of data per pixel), and framing rate of the captured image stream communicated over the surveillance network may be adjusted to suit conditions.

Another aspect of the invention is a surveillance system in which video cameras communicate video encoded in a format according to the moving pictures expert group (MPEG).

Another aspect of the invention is to provide a surveillance system that is controlled by a set-top box, television, or other form of consumer video equipment within which surveillance features have been integrated.

Another aspect of the invention is to provide a surveillance system in which the control data may be communicated to each video camera for controlling video camera settings and optionally pan and zoom.

Another aspect of the invention is to provide a surveillance network that may securely communicate selected data to a remote location or be controlled from a remote location securely, such as over an Internet connection.

Another aspect of the invention is to provide a surveillance network in which devices request bandwidth from a server which allocates an amount of bandwidth depending on priorities and activity.

A still further aspect of the invention is provide for controlling a surveillance system using a standard video remote control device, such as when watching a television set.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Figure 1:
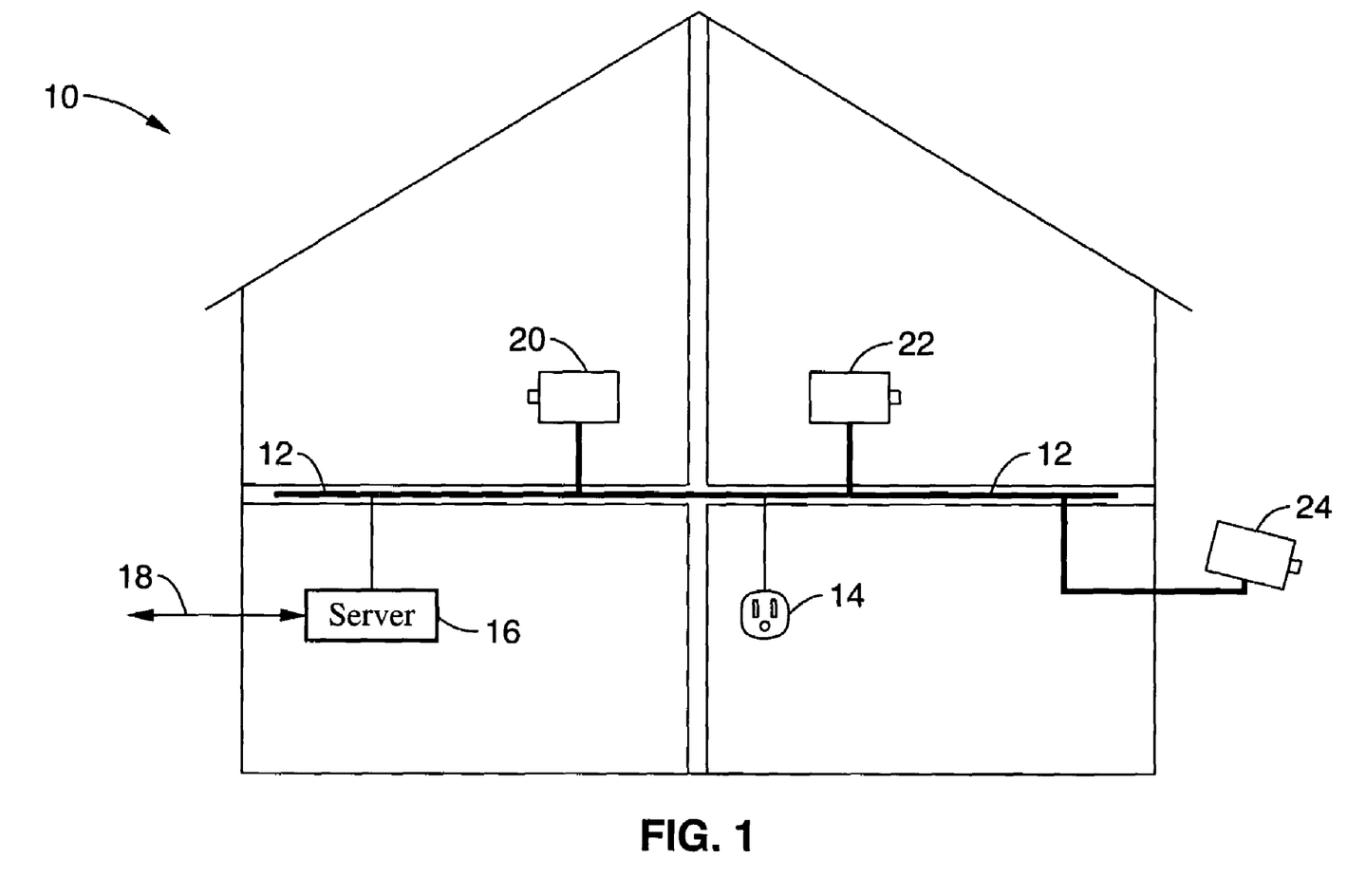
FIG. 1 is a block diagram of a surveillance system according to an embodiment of the present invention, shown with a server communicating with multiple video cameras over a power-line network.
Figure 2:
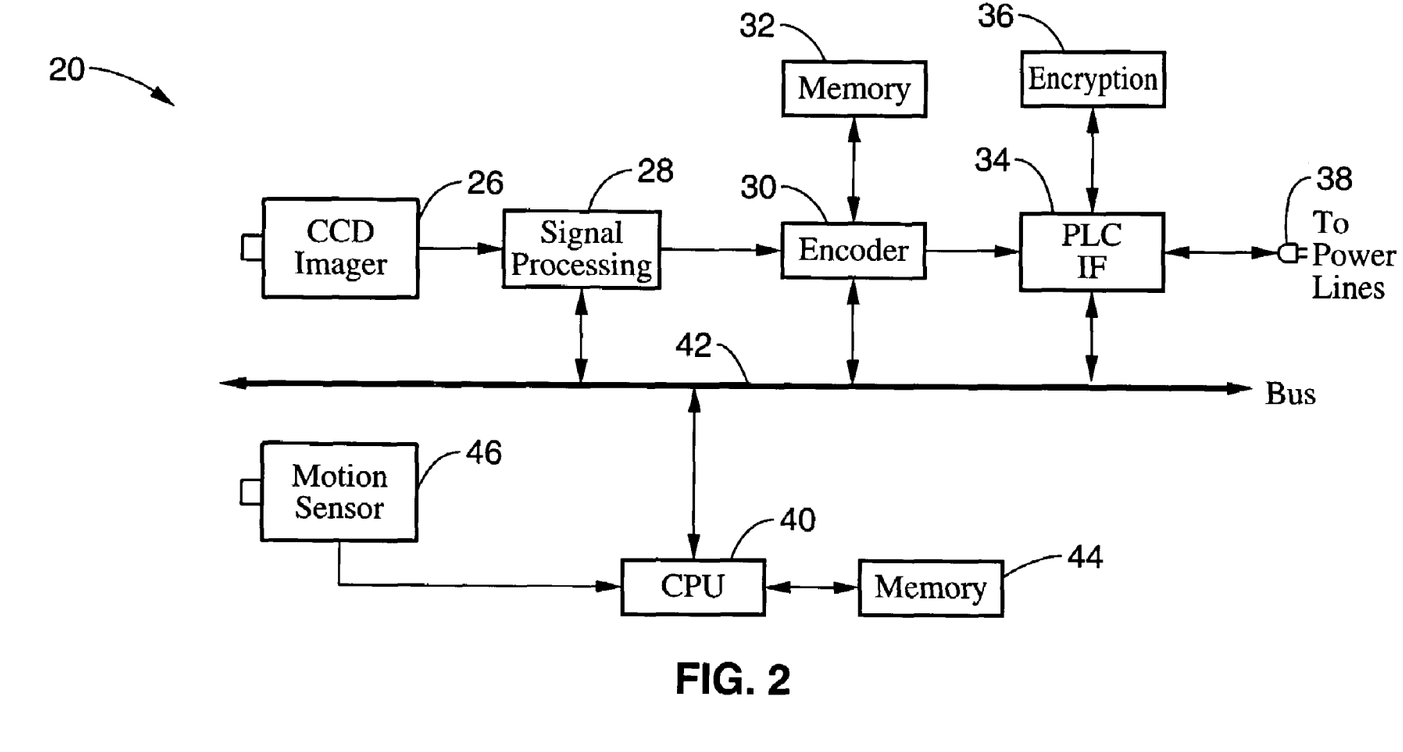
FIG. 2 is a block diagram of a video camera configured for operation within the surveillance system according to an aspect of the present invention, and shown with optional motion sensing circuitry.
Figure 3:
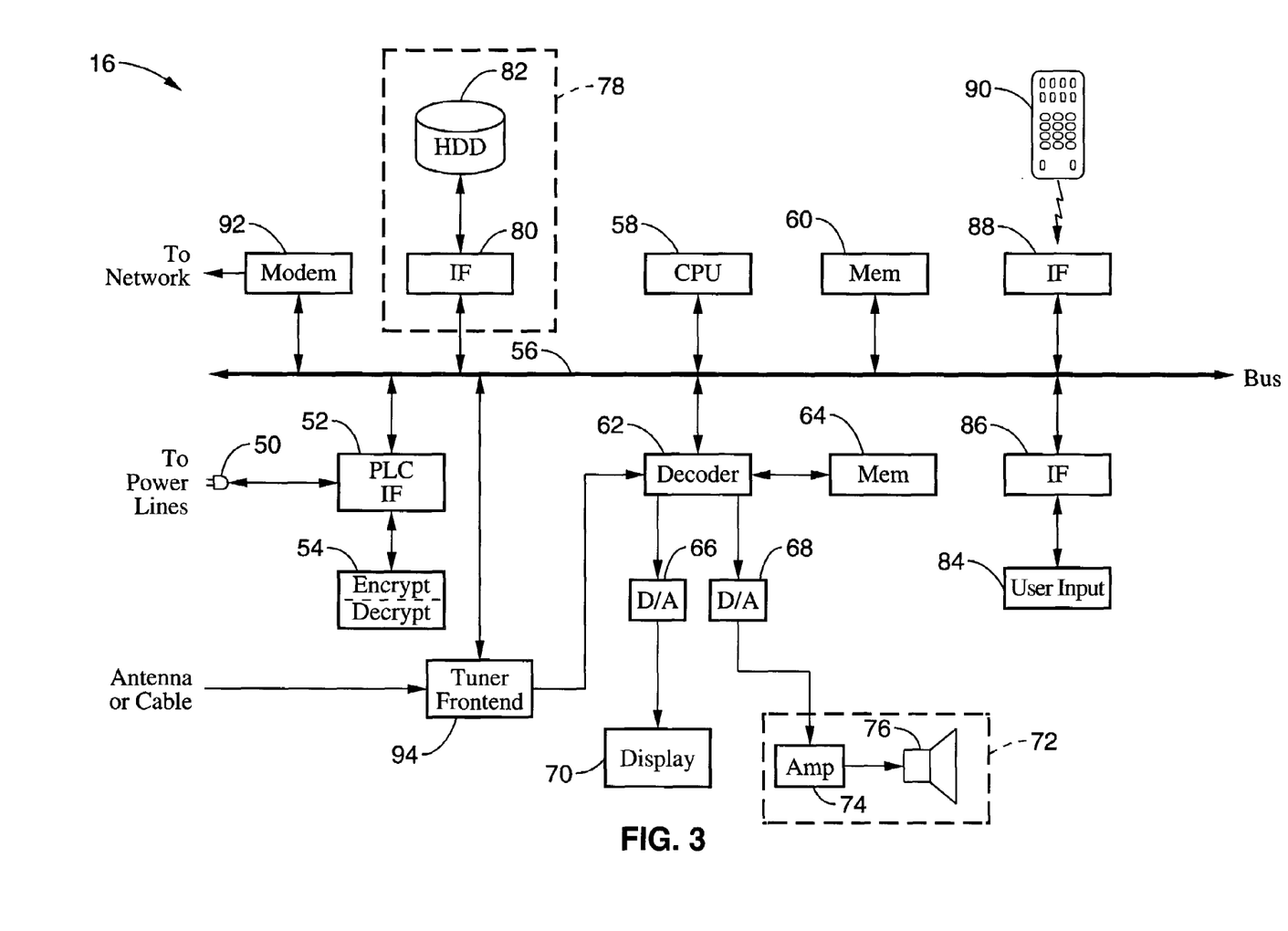
FIG. 3 is a block diagram of a server configured for communicating with and controlling the operation of video cameras and other devices according to an aspect of the present invention, and shown configured for integration within a television set or set-top box.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

1. System Descriptions 1.1 Surveillance System

FIG. 1 illustrates an example of the system shown deployed within a residential structure 10, having power lines 12 routed to multiple outlets, such as represented by outlet 14, in the different rooms and levels within the structure. The system is configured with a server 16 that operates as a control center for the surveillance system and which preferably supports a communication link 18 extending from the structure to an external network, such as a cable modem, XDSL telephone modem connection, or similar link over which data may be remotely communicated, such as over the Internet.

Power lines 12 are utilized as a power-line communication (PLC) network 12 within a residence (or business) for allowing server 16 to communicate with various remote devices. By way of example, a few video cameras 20, 22, 24 are depicted which are configured for transmitting a video stream to server 16 over power-line network 12. It should be appreciated that different forms of clients may be attached to server 16 over power-line network 12, such as video clients (displays), video camera clients, audio clients, sensor clients, and numerous other forms of devices. Video cameras may send audio and/or video streams to server 16, while server 16 is configured to send control commands but not streams to the video cameras.

1.2 Video Cameras

FIG. 2 illustrates an example of a video camera 20 configured according to the present invention for communicating with server 16 over the power-line network. An analog video signal from CCD Imager 26 is sent to signal processor 28, which for example may comprise analog signal conditioning, along with analog-to-digital conversion, and optionally digital post processing, prior to receipt by an encoder 30. The input signal is then encoded by encoder 30 in combination with memory 32 and converted into a digitally formatted stream, such as according to Motion Picture Experts Group (MPEG) standards for video streams, as exemplified herein. PLC interface 34 receives the formatted (i.e. MPEG) video stream, which may be optionally encrypted within encryption module 36, prior to communication of the video feed to server 16 through an AC power plug 38 and the power-line network 12 of FIG. 1. It is preferable that PLC interface 34 encrypts communications over power-line network 12 to prevent information access by unauthorized parties, such as may arise if a competitor or adversary were to tap into the PLC network. It should be readily appreciated that a number of users, such as neighboring homeowners, may share the same distribution transformer wherein PLC network signals being communicating by one user, such as in a first home, are available to additional users, such as in a second, third, fourth, fifth home and so forth.

A control processor 40 for the video camera, such as a central processing unit (CPU), microprocessor (MPU), or high density logic circuitry, is preferably connected through an internal bus 42 to other functional blocks. Control processor 40 can access memory 44 within which is stored programming for executing the control program, and generally data entries, stack space, scratchpad memory, and configuration variables. Commands for video camera 20 are received through PLC interface 34 and communicated to control processor 40, which can likewise communicate status and other information, as well as providing video signal feed, back to server 16.

In response to commands from control processor 40, encoder 30 can preferably adjust at least the resolution and frame rate of the encoded pictures being returned to server 16. These adjustments allow fulfilling dynamic bandwidth allocations determined by the server, such as in response to predetermined or event-driven settings. An as example of bandwidth control, consider an example wherein control processor 40 receives a high-resolution command from server 16 which controls encoder 30 to change the output resolution to 720× 480 from 360×240 pixels. By way of further example, in the case of a low-rate command, encoder 30 may change the frame rate from 30 frames/second to 5 frames/second. Other aspects of the video transmission may also be controlled by encoder 30 to fulifill a desired dynamic bandwidth allocation, such as the selection of a color mode or a monochrome mode which reduces video bandwidth. Furthermore, encoder 30 may optionally perform feature enhancement, light optimization, and so forth to enhance the video from the imager and/or to extract additional information from the image stream. In the embodiment described, the encoding parameters are preferably sent based on the MPEG standard, allowing automatic decoding of mode selection for the received video within server 16.

A motion sensor 46 is also shown connected to control processor 40 which detects motion typically in the field of view of imager 26. Other sensors may be utilized additionally, or as an alternative, to motion sensor 46, such as infrared sensors, pyroelectric detectors, audio detectors, and so forth. Motion sensor 46 sends a signal to control processor 40 in response to detected motion, which communicates the condition to server 16. Server 16 may respond to the detection of motion by changing the prioritization of the video camera input and/or assigning a larger bandwidth to the video camera input.

It should be appreciated that other methods may be relied upon for sensing motion. By way of example, if encoder 30 is implemented for encoding video in an MPEG format, it will extract motion vectors for each video block as part of the encoding process. When no motion exists in the frame, all the motion vectors are zero. Encoder 30 may be adapted to transmit a signal to control processor 40 in response to motion vectors crossing a given threshold value. This motion threshold value being set sufficiently high so as not to be exceeded by activation or deactivation of lighting, the flight of insects and moths in the field of view, and other common non-threatening motion scenarios.

Another solution for motion detection is to utilize a highpass filtered (i.e. differential) video signal which is converted to digital in signal processor 28, with a result being added up and a total value obtained at each frame. The value is monitored, and in response to fluctuations beyond a predetermined, or computed threshold value, signal processor 28 sends a signal informing control processor 40 of the detected motion. As an alternative to determining a total value, the maximum value in a frame may be employed for motion sensing. These few examples being provided by way of illustration, wherein it should be appreciated that motion may be detected in a number of alternative ways known to one of ordinary skill in the art.

1.3 Server

FIG. 3 illustrates by way of example the functionality within server 16. A video stream or data is received from AC power plug 50 to PLC interface 52 which decodes the power-line transmissions and decrypts received data or encrypts outgoing data through encryption-decryption module 54. PLC interface 52 communicates information across bus 56 to a central processor 58 and/or in some cases other functional blocks connected to bus 56. The available bandwidth within the PLC network is dynamically allocated by central processor 58 which controls its own use of bandwidth and the bandwidth utilized by video imaging devices and other devices connected on the PLC network. Central processor 58 operates in combination with memory 60 to typically control all the blocks connected to bus 56. Programming, temporary data storage, operating data and parameters, and so forth are stored in memory 60 for use by central processor 58.

By way of example the video data stream received by PLC interface 52 may arrive from video camera 20, 22, 24 as shown in FIG. 1, or from ot cameras or devices connected on power-line network 12. Video streams are passed to a decoder 62 which decodes the digital video formatting in combination with memory 64 into an appropriate format for output, such as on a display and audio system. The input format to decoder 62 preferably follows an MPEG standard, although other video protocols may be utilized. Decoding is exemplified herein for providing analog outputs as the decoder drives digital-to-analog converters 66, 68, into a display device 70 and an audio device 72, comprising an amplifier 74 and an audio annunciator 76, such as a speaker or system of speakers. If the video, or portions thereof, are to be recorded within the system, the video stream from PLC interface 52 is also communicated to a data storage device 78, exemplified as a storage interface 80 controlling a hard-disk drive 82, or other form of fixed or removable storage media, and/or a form of solid state memory.

The system of the invention may be controlled by the user in a number of ways, for example a set of user inputs 84 is shown connecting through an interface 86. User input 84 may comprise a simple keypad, a keyboard, a pointing device, or any other convenient user interface supported by server 16. Additionally, a wireless communication port 88 is preferably supported which by way of example can receive commands from an infrared remote control device 90, such as for controlling a television set or video recorder.

Modem 92, or other remote network communication interface, is configured for communicating from the server to the environment beyond the power-line network, such as through the Internet. Modem 92 allows the system to operate in a larger context, for example as a server providing remote access to authorized parties, or as a client of external services. Remote access allows a person, such as a homeowner, to be remotely alerted to conditions at their residence, to control aspects of the system, and to view or otherwise monitor household activity, such as video streams generated by the surveillance video cameras. When operating as a client, services may be utilized from a network, such as the Internet, for example extracting data from database services, communicating with security personnel at a central station, downloading new system and device drivers or parametric data, and so forth.

It should be appreciated that the surveillance system of the present invention may be integrated within consumer electronic devices which have been configured with the requisite communication, decoding, storage, and display capabilities. As an example, an embodiment as so far described above may be considered to be integrated within a television set, or set-top box, having Internet connectivity and a power-line interface as described.

A tuner front-end 94 may be coupled to or within server 16 for providing television reception, and playback from video and/or audio systems having RF output. Tuner front-end 94 receives an RF signal from an antenna, satellite down-converter, or a cable network passing it to decoder 62, which in combination with memory 64, decodes the demodulated signal for display. It should be appreciated that television style programming may be received from the reception of broadcast televised programming, as well as cable based or satellite based television programming. The system may also record the video stream, wherein decoder 62 sends the stream to data storage device 78 through bus 56. To replay the video stream, decoder 62 in combination with memory 64, receives the video stream from data storage device 78, and/or the stream may be communicated over modem 92, or over the power-line network 12 to external displays and/or audio or video equipment.

The incorporation of the surveillance system within a television or set-top box unit, or similar, can provide a nexus of benefits. By way of example, a user watching the television, or a television connected to the system, can be alerted on-screen when motion is sensed by one of the video cameras. For instance, a small window may be opened on the video screen in response to detected motion upon which the video stream is displayed from the associated video camera. The user may then elect how they want to deal with the situation, and may zoom the video camera stream window up to full-size and view other video camera streams, and control other operations under the direction of the surveillance system, or even connected through the modem to external networks such as telephone or the Internet, such as summoning help.

Alternatively, one or more overlapped small screens may be displayed continuously in a portion of the screen showing selected video feeds while the user watches television or other programming on the remainder of the screen. These small screens can be selected to zoom them to full size, when appropriate. It should be appreciated that a number of additional features are inherent in combining the surveillance system of the present invention with other consumer electronic devices, as will be obvious to one skilled in the art. Integrating functionality in this manner provides a number of benefits as outlined above.

1.4 Bandwidth Control

Server 16 manages bandwidth utilization within PLC network 12. Toward optimizing utilization of bandwidth, the devices connected to the server over PLC network 12 send a request for bandwidth assignment prior to sending a data stream. Central processor 58 within server 16 receives bandwidth requests from devices on the PLC network while having its own set of transmission requests for sending data out to devices connected on the PLC network, such as displays, annunciators, and so forth. Allocation is determined in response to these requests by central processor 58 within server 16 toward optimizing bandwidth use based on priority and size considerations.

Consider the example of two bandwidth requests, for streams X and stream Y. Although stream X may be of slightly higher priority than stream Y, the relative priority of communicating steam X in color (as opposed to monochrome) is probably less than the importance of communicating stream Y in monochrome. The allocation routines, therefore, preferably take into account the incremental priorities of the request, wherein an action may be defined by a number of priorities, allowing tradeoffs to be made readily between priority and bandwidth. Additionally, the associated data sizes of a data transfer may be taken into account when appropriate. By way of example, consider a request for transmitting a block of control information to a device. The control information may be of lower priority than a given stream, but since the control information may include only about one hundred bytes while the stream is continuous using about over a hundred thousand bytes per second, it is probably more important to pass the few control bytes while dropping stream bandwidth (at least for a short time), or delaying transmission, or taking other bandwidth reducing measures. One preferred method of handling short blocks of control data considering their generally small size is to automatically allocate bandwidth for them at higher priority than any streams, wherein the allocation routine is not bogged down with working out priorities on small data blocks.

Consider an example of bandwidth control, wherein it is assumed that the total bandwidth of the PLC network 12 is eight megabits per second (8 Mbps) according to a payload rate, while server 16 sends a five megabits per second (5.0 Mbps) video stream to a data storage media on a client, such as for a timer recording (not shown). In this scenario the highest priority (i.e. priority=1) may be given to the timer-recording stream, with inputs from video camera 20, 22, 24 being at a lower priority (i.e. priority=2) and held to sending video streams at a one megabits per second (1.0 Mbps) rate from each video camera (i.e. priority level of two). This situation is listed in Table 1.

Consider that video camera 24 then detects a motion, wherein it communicates the detected motion to 16, which raises the priority of video camera 24 (i.e. priority changes from 2 to 1), while lowering the priority of the timer-recording stream (i.e. priority changed from 1 to 2), and dropping the priority of video cameras 20, 22 down to even a lower priority (i.e. priority=3). This example situation of bandwidth reallocation is listed in Table 2.

Bandwidth allocation may occur with server 16 sending a command to video camera 24 requesting a video stream rate of four megabits per second (4.0 Mbps) from the current one megabit per second. In response video camera 24 raises video resolution and/or frame rate. If the new bandwidth supplied does not support the higher resolution or higher frame rate, the video camera may for example raise only the picture quality, allowing the user to view captured motion at a higher quality.

In response to cessation of detected motion by video camera 24, it may send a signal to server 16 requesting the bandwidth be returned to the original data rate, wherein video camera 24 would alter picture resolution, frame rate and picture quality to the original setting when commanded to do so by server 16. By way of example and not of limitation, bandwidth for each device may be set to default values as listed in Table 1.

Utilizing this bandwidth control mechanism, or a similar scheme, the limited network bandwidth is efficiently utilized allowing more devices, such as video imagers (video cameras), to be installed on the given network. In addition bandwidth allocation provides a means for regulating the rate at which recording space, such as in a hard disk drive, is being consumed. It should be appreciated that video imagers adapted for operation within the present system, may be configured to communicate a video stream only in response to detecting a valid trigger condition, such as the detection of motion, for example when someone approaches and/or attempts to break into an area under surveillance. This approach eliminates the collection and display of video streams of static image conditions, such as empty rooms and entryways, and reduces storage requirements. Alternatively, the system may buffer video streams for some period of time, without displaying them to a user. If the video camera is then triggered by sufficient detected motion, the prior segment of video is available and may be stored with the video that was collected after the motion trigger.

1.5 Remote Monitoring

A beneficial optional feature of the present surveillance system is that of providing remote monitoring by the surveillance system, such as utilizing a modem to communicate to a remote location over the Internet. In this way an authorized user can access surveillance data, such as viewing surveillance video from each video camera, and control the operations and configuration of the surveillance system. For example, in response to detecting motion by one of the video cameras, the server can initiate a communication to one or more authorized users over a telephone number, such as a cellular phone number. The user may view video over the small video screen of the phone to monitor the situation. The user may elect to then call a neighbor, a security company, or the sheriffs department. The system can be configured to allow the user to communicate commands for controlling the system using key entry, voice commands, menu navigation and so forth.

According to one optional aspect of the system the user can select to have input from a microphone, such as the microphone on a cellular phone, to be directed for output from one or more audio annunciators at the area under surveillance. This ability can provide concrete evidence to a suspected intruder that they are being watched, whereupon they are more likely to take their leave.

By way of example, the system may be configured to generate an alert to the user when someone approaches a secured area, such as the front door, which may be optionally qualified by registering a doorbell activation or door knocking. Upon being triggered in this manner, the system is preferably configured to allow the user to interact with the party at the door, if they so desire. The system in this mode can operate as a form of intercom for communicating with persons remotely.

The remote communication can be utilized for allowing a remote security company to monitor activity from the surveillance system and to take appropriate actions. For example, the security company may view and/or record the incoming video stream, such as to a hard disk drive, wherein security personnel are alerted and some evidence made available, despite subsequent disconnection or damage to the surveillance system by an intruder.

The communication with remote services by the server is preferably encrypted, wherein a password or other suitable authorization token (i.e. PIN, bio-metric data about user, and so forth) is required to decrypt the information. The remote capabilities allows a user that is at work or on vacation to rest secure in the knowledge that their residence is being monitored and that they will be notified in the event that a possible problem is detected, whereupon they may take corrective actions.

2. Optional Aspects

It should be appreciated that devices connected to the PLC network according to the invention may be electronically commanded by the server to execute any desired additional functionality. By way of example and not of limitation, zooming, tilting or panning capabilities of the video camera in addition to the control of video modes and encoding as described above. The user may modulate the video camera angle (positioning and zooming) with a remote control, or utilizing a remote communication device, such as a phone, PDA, or computer system, to see whatever is of interest.

Remote content storage may be provided for the system, wherein content is communicated to a remote data storage unit, preferably located in a hidden location within the same building, such as a hard disk drive subsystem installed within the attic of a house and communicating over a wired, or more preferably a wireless connection, with the server. Video data may be buffered within the remote content storage system, wherein video and other data may be saved that precedes a trigger event, such as motion, but is otherwise discarded. The surveillance information (evidence) is therefore kept secure from intruders.

It should be appreciated that wireless communication networks or other forms of network connectivity may be less preferably utilized, instead of the PLC network, without departing from the teachings of the present invention. It should be appreciated that the PLC network may be utilized in combination with wireless networking or other forms of networking to provide adequate coverage for the site. By way of example, a remote solar-powered video camera may be connected to the surveillance system over a wireless link connecting into the server or connected into the PLC network.

The system can be configured to scroll through video camera images on a periodic basis, wherein the image from each video camera is shown for a given length of time on a cyclical basis. This is equivalent to an equal prioritization of inputs.

The system can be configured for prioritization of video camera channels based on a predetermined or programmatic hierarchy. Certain video camera inputs may be intrinsically of greater value, such as at an entry way, wherein they may be given a higher priority and displayed more often or for greater lengths of time. Furthermore, remote signals or image information may be utilized to modulate the prioritization hierarchy, for example motion sensing trigger increasing the priority of an associated video camera.

The system is optionally configured for accepting input from additional devices coupled to the system, such as audio or video streaming. Although these sources requires significant bandwidth, still framing may be utilized at periodic intervals until trigger conditions, such as motion, are detected. Other non-video sensors may be coupled to the system, such as sensors for smoke, temperature, water, impact, window or door motion, foot traffic, and so forth. It should be appreciated that these forms of sensors require only a small amount of bandwidth. Output from these sensors can be configured to trigger prioritization changes of system inputs, such as video cameras located in the vicinity of the sensor, or even changing orientation on video cameras located in the vicinity to point toward the detected event. Separate sensor may be coupled to the system, or they may be integrated with the video camera.

Similarly, the system is optionally configured for conveying information to additional output devices. The system can direct information to other monitors connected over a residential network (wired or wireless) or remote access device connected over the Internet, or other network. Aside from these Internet type connections, the power-line network within the residence may be utilized by the system for conveying output information to emergency annunciators and control devices, such as alarms, light flashers, strobes, electronic door locks, fans, light control modules, pumps, and so forth.

The present invention has been described according to a preferred embodiment having one or more optional features. It should be appreciated that the invention may be implemented with or without these features or variations thereof without departing from the teachings of the present invention. Aspects of the invention may be practiced in combination, or in some cases separate from the overall surveillance system, without departing from the teachings of the invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Default Bandwidth Settings within 8 Mbps PLC Channel

| Priority | Channel | Bandwidth |
| --- | --- | --- |
| 1 | Timer Rec | 5.0 Mbps |
| 2 | Camera 20 | 1.0 Mbps |
| 2 | Camera 22 | 1.0 Mbps |
| 2 | Camera 24 | 1.0 Mbps |

TABLE 2

Bandwidth Reallocation in Response to Motion

| Priority | Channel | Bandwidth |
| --- | --- | --- |
| 1 | Camera 20 | 4.0 Mbps |
| 2 | Timer Rec | 2.0 Mbps |
| 3 | Camera 22 | 1.0 Mbps |
| 3 | Camera 24 | 1.0 Mbps |

What is claimed is:

1. A system for providing area surveillance, comprising:
at least one video imaging device configured for transmitting a video data stream as a signal over an AC power-line;
at least one bandwidth configuration setting associated with said at least one video imaging device;
said bandwidth configuration setting can be remotely adjusted to any of multiple settings which dynamically alter the bandwidth of said video data stream transmitted over said AC power-line;
a video display interface device;
means for receiving said video data stream from said AC power-line and controlling presentation of said received video data stream as passed to said video display interface device for storage or presentation to a user; and
means for dynamically allocating bandwidth over said AC power-line for said video imaging device as well as for additional video imaging devices, in response to remotely adjusting said bandwidth configuration settings associated with said at least one video imaging device.

2. A system as recited in claim 1, wherein said dynamically allocated bandwidth is responsive to the bandwidth needs of additional video imaging devices, or other devices, communicating over said AC power line.

3. A system as recited in claim 2, wherein said dynamic allocation of bandwidth is performed in response to predetermined and event-driven settings.

4. A system as recited in claim 3, wherein said dynamic allocation of bandwidth modulates the amount of bandwidth allocated to said video imaging device in response to a detected motion event.

5. A system as recited in claim 1, wherein said bandwidth related configuration of said video imaging device comprises at least one video control parameter selected from the group consisting essentially of color depth, image size, image resolution, and framing rate.

6. A system as recited in claim 1, further comprising a mass-storage device configured for storing said video data streams received from said at least one video imaging device.

7. A system as recited in claim 1, wherein said video display interface comprises a computer server.

8. A system as recited in claim 7, wherein said computer server comprises:
a computer operating as a video server configured for communicating video data streams within a selectable bandwidth allocation over said AC power line with video imaging devices; and
a remote communication link within said computer server which is configured for communicating video signals received from at least one said video imaging device to a location beyond the communication range of said AC power line.

9. A system as recited in claim 1, further comprising a user interface configured for capturing user commands for controlling the collection and display of said video streams.

10. A system for providing area surveillance, comprising:
at least one video imaging device connected to an AC power-line and configured for generating a video data stream of an area under surveillance;
at least one bandwidth configuration setting within said at least one video imaging device;
said bandwidth configuration setting can be remotely adjusted to any of multiple settings which alter the bandwidth necessary for transmitting said video data stream over said AC power-line;
a computer server connected to said AC power-line and configured for receiving said video data stream and communicating said video data stream to a display device according to user preferences;
a data storage device coupled to said computer server configured for storing portions of said video data stream; and
a user interface within said computer server configured for capturing user preferences for controlling the collection and display of said video data streams;
wherein said computer server is configured to dynamically allocate bandwidth for video imaging devices in response to remotely adjusting said bandwidth configuration settings within said at least one video imaging device based on predetermined or event-driven settings.

11. A system as recited in claim 10, wherein said dynamic allocation of bandwidth modulates the amount of bandwidth allocated to said video imaging device in response to a detected motion event.

12. A system as recited in claim 10, wherein said dynamic allocation of bandwidth comprises modulating settings within said video imaging device which determine the bandwidth of the video data stream being output.

13. A system as recited in claim 10, wherein at least one setting of said video imaging device being modulated is selected from the group consisting essentially of color depth, image size, image resolution, and framing rate.

14. A system as recited in claim 10, wherein said user interface comprises an interface to a wireless remote control device.

15. A system as recited in claim 10, wherein said user interface comprises wired connections to user input selectors.

16. A system as recited in claim 10, wherein said user interface comprises a connection through a remote communications link configured for communicating with a remote electronic device interacting with a user at a remote location.

17. A system as recited in claim 16, further comprising means of authenticating a user communicating through said remote communications link as said user interface.

18. A system as recited in claim 17, wherein said means of authenticating comprises decrypting communications with said remote electronic device in response to the entry of a proper identifier.

19. A system as recited in claim 16, wherein said remote communications link is configured for communicating video signals received from said video imaging device to a location outside the extent of communication over said AC power-line.

20. A system as recited in claim 10, wherein said video data streams comprise encoded video signals.

21. A system as recited in claim 20, wherein said video signals are encoded according to a moving pictures expert group (MPEG) format.

22. An apparatus for imaging an area under video surveillance, comprising:
   at least one image sensor configured for transmitting a video data stream as a signal over an AC power-line;
   at least one bandwidth configuration setting associated with said at least one video imaging sensor;
   said bandwidth configuration setting can be remotely adjusted to any of multiple settings which dynamically alter the bandwidth of said video data stream transmitted over said AC power-line; and
   a communications interface coupled to said at least one image sensor and configured for communicating the video data stream from said at least one image sensor over an AC power-line with a server from which dynamic bandwidth allocations are received;
   wherein video signals from said image sensor are subject to said dynamic bandwidth allocation in response to adjusting said bandwidth configuration settings based on commands received from the server prior to transmission of said video data stream through said AC power-line to said server.

23. A system as recited in claim 22, wherein said dynamically allocated bandwidth is responsive to predetermined or event-driven bandwidth needs.

24. A system as recited in claim 23, wherein said dynamic allocation of bandwidth modulates the amount of bandwidth allocated to said video imaging device in response to a detected motion event.

25. A system as recited in claim 23:
   wherein said dynamic allocation of bandwidth comprises modulating video control settings within said video imaging device which determine the bandwidth of the video data stream being output;
   wherein at least one said video control setting is selected from the group consisting essentially of color depth, image size, image resolution, and framing rate.

26. An apparatus as recited in claim 22, further comprising a means for encoding said video signals into a format according to a Moving Picture Experts Group (MPEG) video format.

27. An apparatus as recited in claim 22, further comprising a means for sensing motion and communicating said motion over said AC power-line to said server.

28. An apparatus as recited in claim 27, wherein said means for sensing motion comprises a motion detector.

29. An apparatus as recited in claim 27, wherein said means for sensing motion comprises extracting motion vectors when encoding said video signals into a format according to a Moving Picture Experts Group (MPEG) video format.

30. An apparatus as recited in claim 22, further comprising an encryption circuit for encrypting said video signals for communication over said AC power-line to said server.

31. An apparatus for monitoring and controlling video surveillance, comprising:
   a power-line interface configured for communicating over an AC power-line with multiple remote video imaging devices which are configured for transmitting a video data stream as a signal over an AC power-line;
   wherein at least one bandwidth configuration setting associated with each of the remote video imaging devices;
   wherein said bandwidth configuration setting can be remotely adjusted to any of multiple settings which dynamically alter the bandwidth of said video data stream transmitted over said AC power-line; and
   a user interface configured for capturing user preferences for controlling the collection and display of said video streams; and
   a computer server configured for allocating bandwidth to remote video imaging devices and receiving video streams subject to said bandwidth allocation in response to adjusting said bandwidth configuration settings based on commands received by each remote video imaging device from the computer server prior to transmission of said video data stream from each remote video imaging device over said power-line interface, said computer server also configured to communicate said video streams for storage and/or display in response to said user preferences.

32. An apparatus as recited in claim 31, wherein said computer server is configured with an internal storage device within which said video streams may be stored.

33. An apparatus as recited in claim 31, further comprising a remote communications interface configured for communicating said video streams from said computer server to a user at a remote location beyond the range of said power-line interface.

34. An apparatus as recited in claim 31, wherein said power-line interface, said user interface and said computer server are integrated within a set-top box, television, or video recording device.

35. An apparatus as recited in claim 31, further comprising a television tuner coupled to said server for the reception of broadcast television, and cable based or satellite base video programming.

36. An apparatus for controlling video surveillance, comprising:
   a power-line interface configured for receiving video data streams from multiple video imaging devices which are configured for transmitting a video data stream as a signal over an AC power-line;
   wherein at least one bandwidth configuration setting associated with each of the remote video imaging devices;

wherein said bandwidth configuration setting can be remotely adjusted to any of multiple settings which dynamically alter the bandwidth of said video data stream transmitted over said AC power-line; and a computer configured for communicating said video data streams to a display device; and programming executable on said computer for,
  interacting with a user for controlling the receipt and display of said video data streams, and
  controlling the bandwidth of said video data streams generated by said video imaging devices when multiple video imaging devices are active;

wherein bandwidth is dynamically allocated for the video streams generated by the video imaging devices; and wherein said dynamic allocation is performed in response to adjusting said bandwidth configuration settings based on commands received by each of the multiple video imaging devices prior to transmission of said video data stream.

37. An apparatus as recited in claim 36, further comprising a data storage unit configured for storing said video data streams received from said video imaging devices.

38. An apparatus as recited in claim 36, wherein said programming for said controlling of said bandwidth of said video data streams comprises:
  receiving bandwidth requests within said computer from video imaging devices;
  determining a bandwidth allocation based on predetermined, or event driven settings; and
  communicating bandwidth controlling commands to said video imaging devices connected over said power-line interface.

39. An apparatus as recited in claim 38, wherein at least one said bandwidth controlling command controls a parameter selected from the group consisting essentially of color depth, image size, image resolution, and framing rate.

40. A computer readable medium encoded with a computer program having executable instructions which, when executed by a controller for at least one video imaging device capable of receiving video streams over a power-line communication network and of outputting video streams to a display device, causes the controller to perform the steps comprising:
  interacting with a user for controlling the receipt and display of video data streams;
  controlling the bandwidth of said video data streams generated by the video imaging devices;
  wherein at least one bandwidth configuration setting for each of the video imaging devices can be remotely adjusted to any of multiple settings for dynamically altering the bandwidth of the video data stream transmitted over the power-line communications network; and
  communicating selected portions of the video signals from the video imaging device to a display device connected to the video imaging device;
  wherein bandwidth is dynamically allocated within the video imaging devices in response to adjusting said bandwidth configuration settings based on commands received by the video imaging devices prior to transmission of said video data stream.

41. A method of providing area surveillance, comprising:
  generating video signals within at least one video imaging device in response to video surveillance of one or more areas;
  controlling at least one bandwidth configuration setting which determines the bandwidth necessary for transmitting said video signals;
  communicating said video signals over an AC power line subject to a dynamic bandwidth allocation in response to said bandwidth configuration settings;
  receiving said video signals within a computer server connected to said AC power line;
  communicating said bandwidth configuration settings from said computer server to said at least one video imaging device; and
  communicating selected portions of said video signals from said computer server to a display in response to predetermined or event driven criterion.

* * * * *